(12) United States Patent
Liu

(10) Patent No.: US 12,532,396 B2
(45) Date of Patent: Jan. 20, 2026

(54) WARNING LIGHT CONTROL DEVICE

(71) Applicant: Zhi Liu, Zhongshan (CN)

(72) Inventor: Zhi Liu, Zhongshan (CN)

( * ) Notice: Subject to any disclaimer, the term of this patent is extended or adjusted under 35 U.S.C. 154(b) by 151 days.

(21) Appl. No.: 18/603,655

(22) Filed: Mar. 13, 2024

(65) Prior Publication Data

US 2025/0254783 A1    Aug. 7, 2025

(30) Foreign Application Priority Data

Feb. 3, 2024   (CN) .......................... 202420269295.1

(51) Int. Cl.
| | | |
|---|---|---|
| *H05B 47/175* | (2020.01) | |
| *F21V 11/08* | (2006.01) | |
| *F21V 17/16* | (2006.01) | |
| *F21V 21/092* | (2006.01) | |
| *F21V 21/26* | (2006.01) | |
| *F21V 21/30* | (2006.01) | |
| *F21V 23/04* | (2006.01) | |
| *F21Y 113/00* | (2016.01) | |
| *F21Y 115/10* | (2016.01) | |

(52) U.S. Cl.
CPC ............ *H05B 47/196* (2024.01); *F21V 11/08* (2013.01); *F21V 17/164* (2013.01); *F21V 21/092* (2013.01); *F21V 21/26* (2013.01); *F21V 21/30* (2013.01); *F21V 23/04* (2013.01); *F21Y 2113/00* (2013.01); *F21Y 2115/10* (2016.08)

(58) Field of Classification Search
CPC ..... H05B 47/196; F21V 11/08; F21V 17/164; F21V 21/092; F21V 21/26; F21V 21/30; F21V 23/04
USPC ..................................................... 340/815.45
See application file for complete search history.

(56) References Cited

U.S. PATENT DOCUMENTS

| | | | | |
|---|---|---|---|---|
| 8,031,174 | B2* | 10/2011 | Hamblin ................. | G06F 3/042 |
| | | | | 345/169 |
| 9,193,375 | B2* | 11/2015 | Schramm .......... | B60R 21/21658 |
| 2006/0286944 | A1* | 12/2006 | Songwe ................. | B62D 1/105 |
| | | | | 455/99 |
| 2008/0258900 | A1* | 10/2008 | Frank .................... | B60Q 1/2611 |
| | | | | 340/471 |
| 2018/0208210 | A1* | 7/2018 | Chapman ................. | B62D 1/10 |
| 2022/0001827 | A1* | 1/2022 | Kring ..................... | B60K 35/60 |

\* cited by examiner

*Primary Examiner* — Kerri L McNally
(74) *Attorney, Agent, or Firm* — Wang Law Firm, Inc.

(57) ABSTRACT

The present invention discloses a warning light control device comprising a housing having a circuit board therein, wherein the circuit board comprises a main control module, a human-machine interaction module, and an LED light assembly corresponding to LED chips on the warning light. The housing has a first translucent portion corresponding to the LED light assembly, and the main control module is electrically connected to the human-machine interaction module and the LED light assembly, respectively, allowing the human-machine interaction module to receive external control signals and transmit the signals to the main control module which controls the LED light assembly and the corresponding LED chips on the warning light to flash accordingly.

10 Claims, 6 Drawing Sheets

WARNING LIGHT CONTROL DEVICE

FIELD OF INVENTION

The present invention relates to the field of warning light technology, in particular to a warning light control device.

BACKGROUND OF THE INVENTION

Warning lights are commonly used on police cars, ambulances, and construction vehicles, and are typically mounted on the exterior roof of the vehicle. The interior of a warning light housing contains LED chips and a control circuit board. These lights are activated by connecting a switching power cable to the vehicle's cigarette lighter to provide a warning effect. Warning lights currently on the market generally do not have remote control capabilities. Even when equipped with remote control, they typically offer only single-button control with limited selectable flashing modes, resulting in limited controllability. Users seated in the vehicle during operation cannot directly observe the flashing modes and effects of the warning lights, which is a limitation and inconvenience.

SUMMARY OF THE INVENTION

The purpose of the present invention is to provide a warning light control device that allows for a direct visual observation of the flashing modes and effects of the warning lights, addressing at least one of the technical issues present in the prior art.

According to an embodiment of a first aspect of the present invention, the warning light control device comprises a housing having a circuit board therein which includes a main control module, a human-machine interaction module, and an LED light assembly corresponding to LED chips on the warning light. The housing has a first translucent portion corresponding to the LED light assembly, and the main control module is electrically connected to the human-machine interaction module and the LED light assembly, respectively, allowing the human-machine interaction module to receive external control signals and transmit the signals to the main control module which controls the LED light assembly and the corresponding LED chips on the warning light to flash accordingly.

In some embodiments of the present invention, the housing comprises an interconnected panel and back housing, the circuit board is disposed between the panel and the back housing, and the first translucent portion is disposed on the panel.

In some embodiments of the present invention, the human-machine interaction module is a touch button module, comprising multiple conductive springs and multiple corresponding status indicator lights, with the status indicator lights being disposed within the respective conductive springs and both being electrically connected to the main control module, respectively. The panel is provided with multiple second translucent portions corresponding to the status indicator lights. The conductive springs are capable of transmitting the external control signals to the main control module while the status indicator lights indicate the current operating status of the touch button module.

In some embodiments of the present invention, a light-shielding plate is provided between the panel and the circuit board to prevent light leakage, with the light-shielding plate having translucent holes corresponding to the LED light assembly and the status indicator lights.

In some embodiments of the present invention, the circuit board further comprises a display module for displaying a serial number of the current flashing mode of the warning light, and the display module is electrically connected to the main control module. In addition, the panel is also provided with a display area for observing the display content.

In some embodiments of the present invention, a bracket assembly is further included and a slot is provided on the back housing, wherein the bracket assembly includes a snap block that snaps into the slot such that the bracket assembly can be detachably connected to the back housing.

In some embodiments of the present invention, the bracket assembly comprises a bracket and a locking nut, wherein the top of the bracket has a ball head, the snap block has a ball head holder, the ball head holder has a ball socket that mates with the ball head, and the locking nut is mounted on the ball head holder.

In some embodiments of the present invention, the bracket assembly comprises a base, and the bracket is rotatably connected to the base.

In some embodiments of the present invention, a pivot is included. The lower end of the bracket is provided with a transverse through-hole, and the base is provided with a connecting portion having open holes aligned with the transverse through-hole, allowing the pivot to pass therethrough and pivotally connect the bracket to the base.

In some embodiments of the present invention, the base is provided with a suction cup.

The warning light control device according to the embodiments of the present invention comprises at least the following beneficial effects: Users can send external control signals to the main control module through the human-machine interaction module. The main control module controls the LED light assembly to flash in corresponding modes, wherein the flashing light is transmitted through the first translucent portion for easy observation, and the LED chips on the warning light flash synchronously in correspondence. During use, users seated in the vehicle can directly observe the flashing modes and effects of the warning lights on this control device, making it more convenient to use.

Additional aspects and advantages of the present invention will be set forth in part below and will be apparent in part from the following description or will be obtained by the practice of the present invention.

BRIEF DESCRIPTION OF THE DRAWINGS

Further explanation of specific embodiments of the present invention will be provided in conjunction with the drawings.

DETAILED DESCRIPTION OF THE PREFERRED EMBODIMENTS

Figure 1:
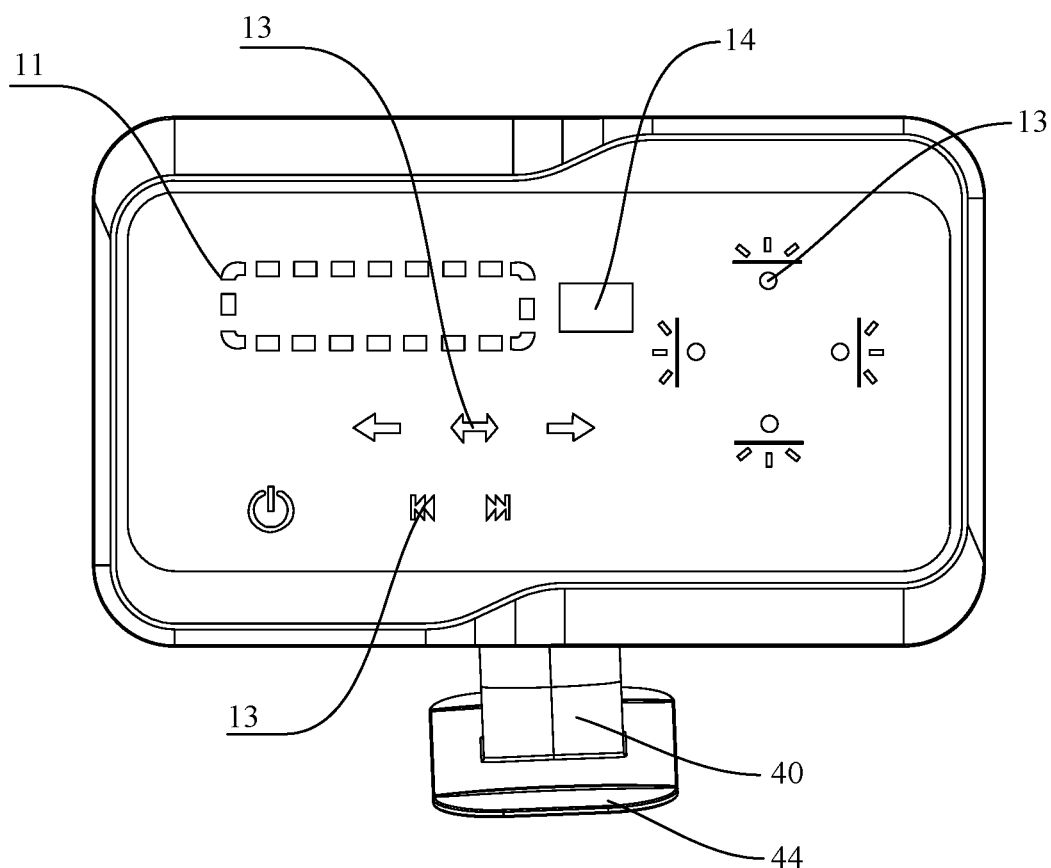
FIG. 1 is a front view of the warning light control device.

This section will provide a detailed description of specific embodiments of the present invention. The preferred embodiments of the present invention are illustrated in the drawings, which supplement the textual description of the specification to provide a clear and visual understanding of each technical feature and the overall technical solution of the present invention. However, they should not be construed as limiting the scope of protection of the present invention.

In the description of the present invention, it should be understood that directional descriptions, such as up, down, front, back, left, right, etc., are based on the orientation or positional relationship shown in the drawings. They are used only for the convenience of describing the present invention and simplifying the description, and do not indicate or imply that the devices or components referred to must have specific orientations, be constructed and operated in specific orientations, and therefore should not be construed as limiting the present invention.

In the description of the present invention, the meaning of several is one or more, and the meaning of multiple is two or more. Terms such as greater than, less than, exceeding, etc. are to be understood as not including the number mentioned, while terms such as above, below, within, etc. are to be understood as including the number mentioned. References to "first", "second", etc., are for the purpose of distinguishing technical features and should not be construed as indicating or implying the relative importance or quantity or sequence of the technical features specified.

Referring to FIGS. 1 through 6, a warning light control device of the present invention comprises a housing having a circuit board 20 therein which includes a main control module 21, a human-machine interaction module 22, and an LED light assembly 23 corresponding to LED chips on the warning light. The housing has a first translucent portion 11 corresponding to the LED light assembly 23, and the main control module 21 is electrically connected to the human-machine interaction module 22 and the LED light assembly 23, respectively, allowing the human-machine interaction module 22 to receive external control signals and transmit the signals to the main control module 21 which controls the LED light assembly 23 and the corresponding LED chips on the warning light to flash accordingly. The main control module uses existing control ICs, and users can send external control signals to the main control module 21 through the human-machine interaction module 22. The main control module 21 controls the LED light assembly 23 to flash in corresponding modes based on these external control signals, where the flashing light is transmitted through the first translucent portion 11 for easy observation, and the LED chips on the warning light flash in synchronism accordingly. During use, users seated in the vehicle can directly observe the flashing modes and effects of the warning lights on this control device, making it more convenient to use.

Further, the housing comprises an interconnected panel and back housing 12, the circuit board 20 is disposed between the panel and the back housing 12, and the first translucent portion 11 is disposed on the panel.

In some embodiments, the human-machine interaction module 22 is a touch button module, comprising multiple conductive springs 221 and multiple corresponding status indicator lights 222, with the status indicator lights 222 being disposed within the respective conductive springs 221 and both being electrically connected to the main control module 21, respectively. The panel is provided with multiple second translucent portions 13 corresponding to the status indicator lights 222. The conductive springs 221 are capable of transmitting the external control signals to the main control module 21 while the status indicator lights 222 indicate the current operating status of the touch button module. The touch button module includes conventional flashing mode buttons, brightness switching buttons, color switching buttons, constant light buttons, front and rear light switching buttons, left flowing flashing buttons, right flowing flashing buttons, double-sided flowing buttons, front searchlight buttons, rear searchlight buttons, left alley light buttons, and right alley light buttons. Each of the above buttons corresponds to one conductive spring 221 and one status indicator light 222, and touching these buttons on the panel can achieve corresponding light effect switching.

Figure 4:
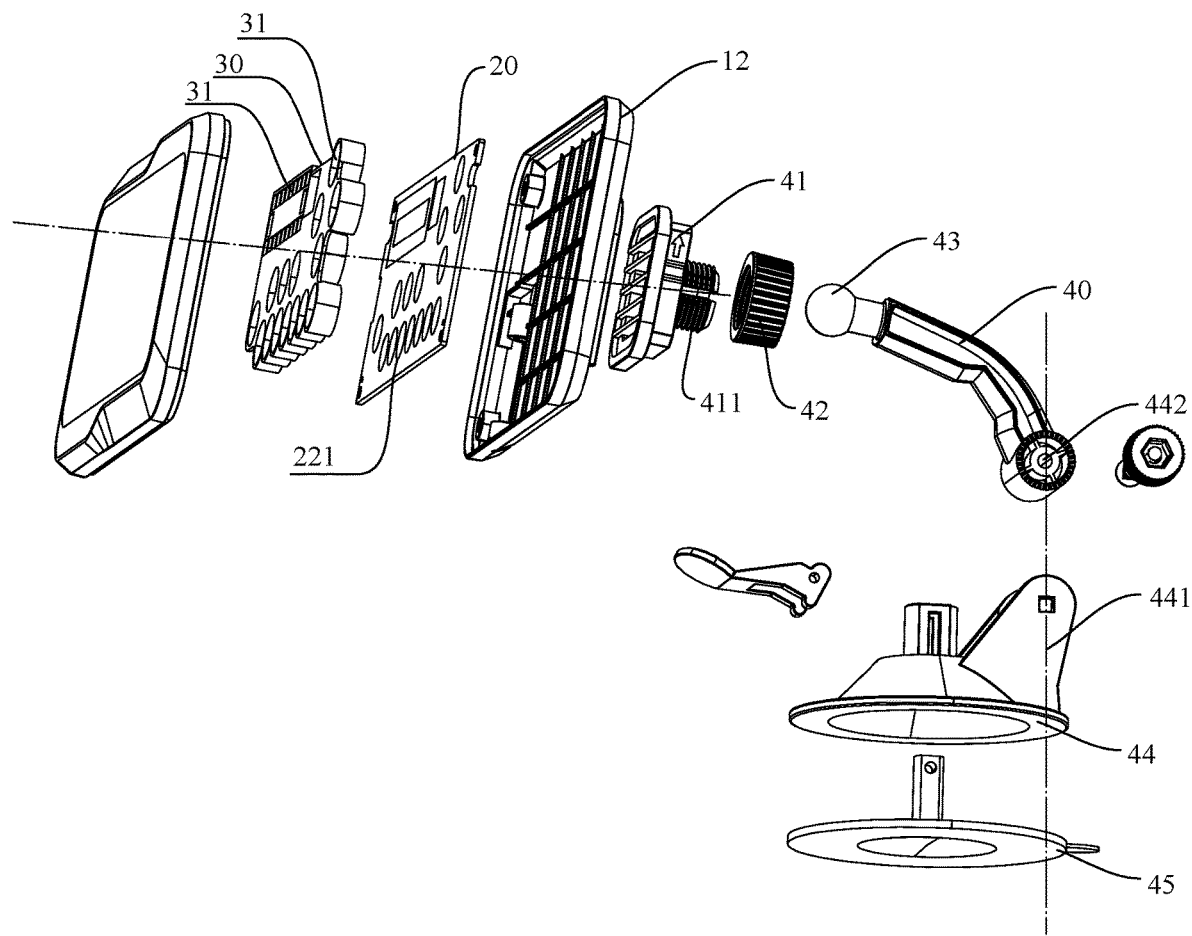
FIG. 4 is an exploded view of one embodiment of the warning light control device.
Figure 5:
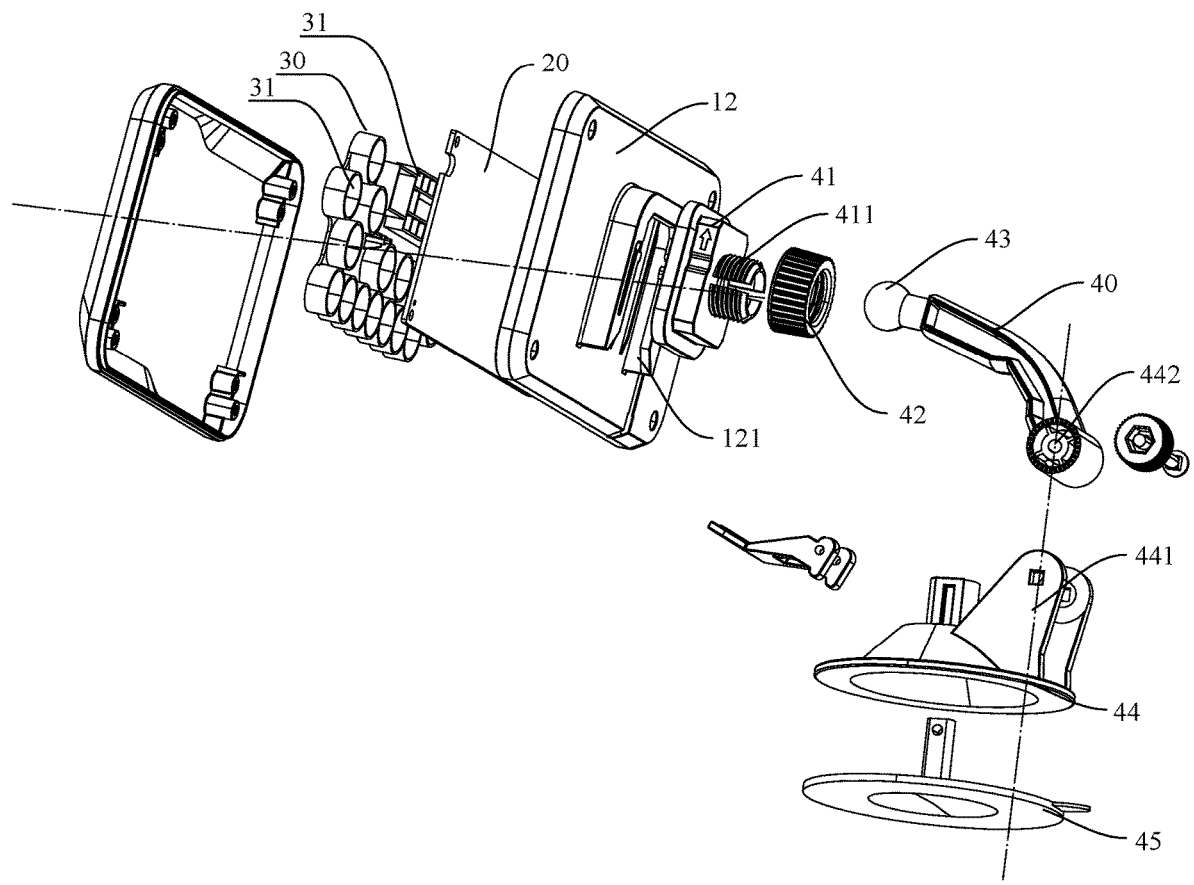
FIG. 5 is an exploded view of another embodiment of the warning light control device.
Figure 6:
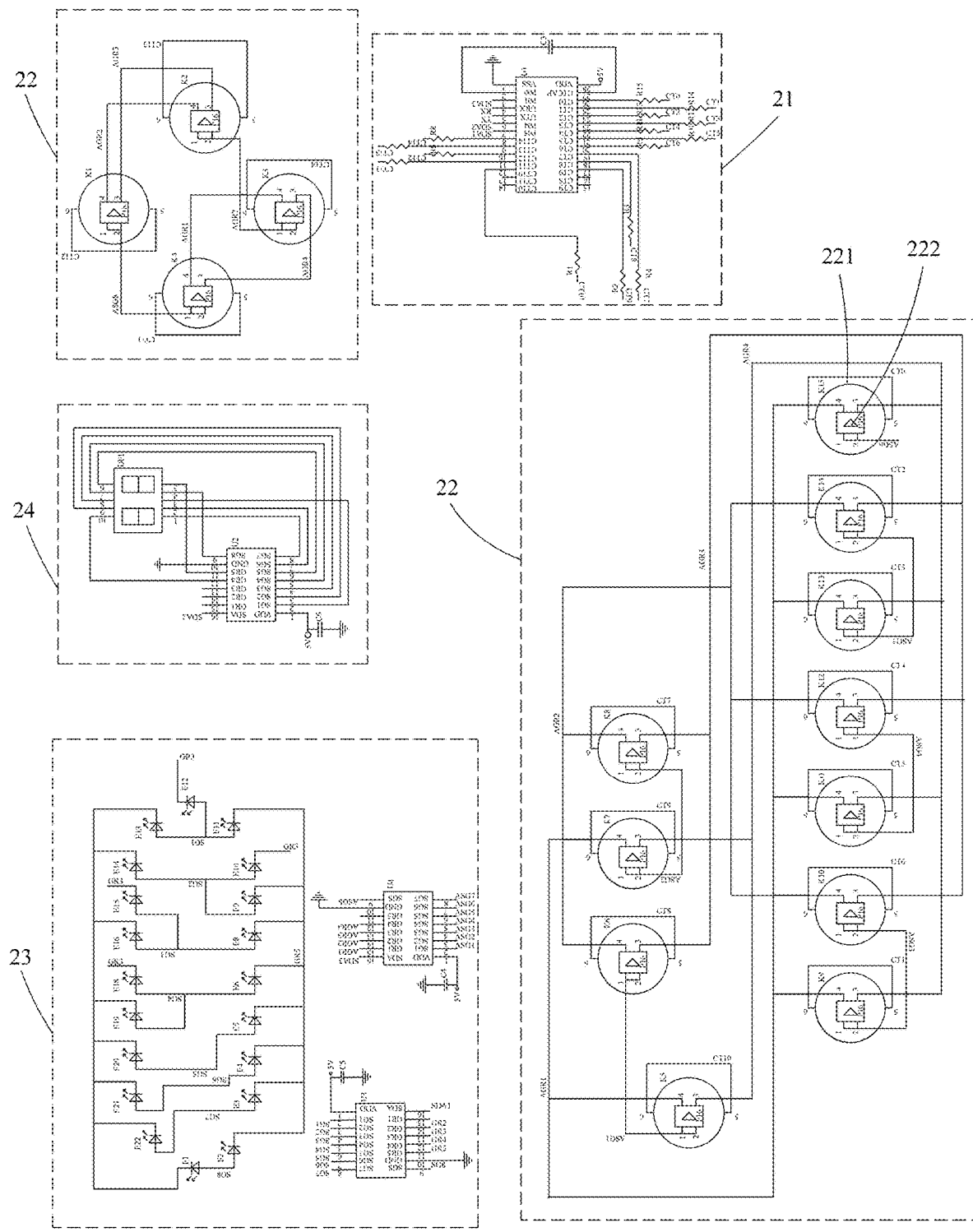
FIG. 6 is a schematic circuit diagram of the warning light control device.

As shown in FIGS. 4 and 5, a light-shielding plate 30 is provided between the panel and the circuit board 20 to prevent light leakage, with the light-shielding plate 30 having translucent holes 31 corresponding to the LED light assembly 23 and the status indicator lights 222.

The circuit board 20 further comprises a display module 24 for displaying a serial number of current flashing mode of the warning light, the display module comprising an LED display screen and a display chip electrically connected to the LED display screen and the main control IC. The panel is also provided with a display area 14 for observing the display content, thereby facilitating user observation of the current flashing mode.

Figure 2:
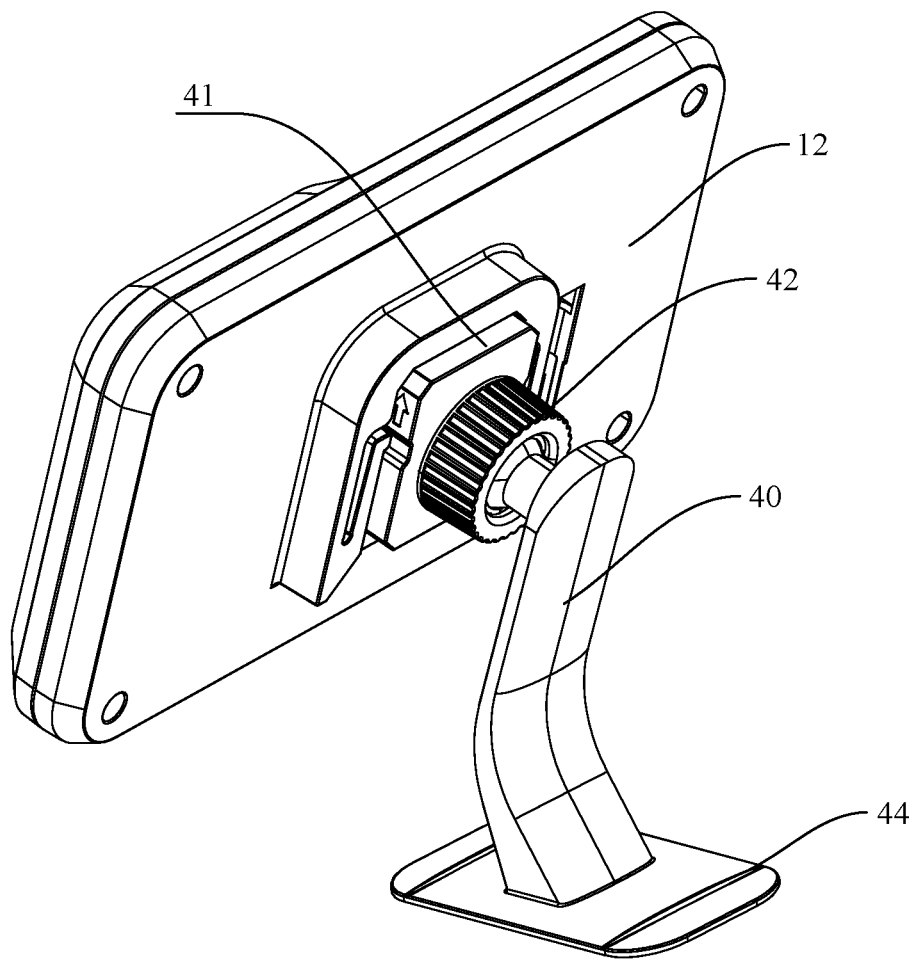
FIG. 2 is a structure diagram of one embodiment of the warning light control device.
Figure 3:
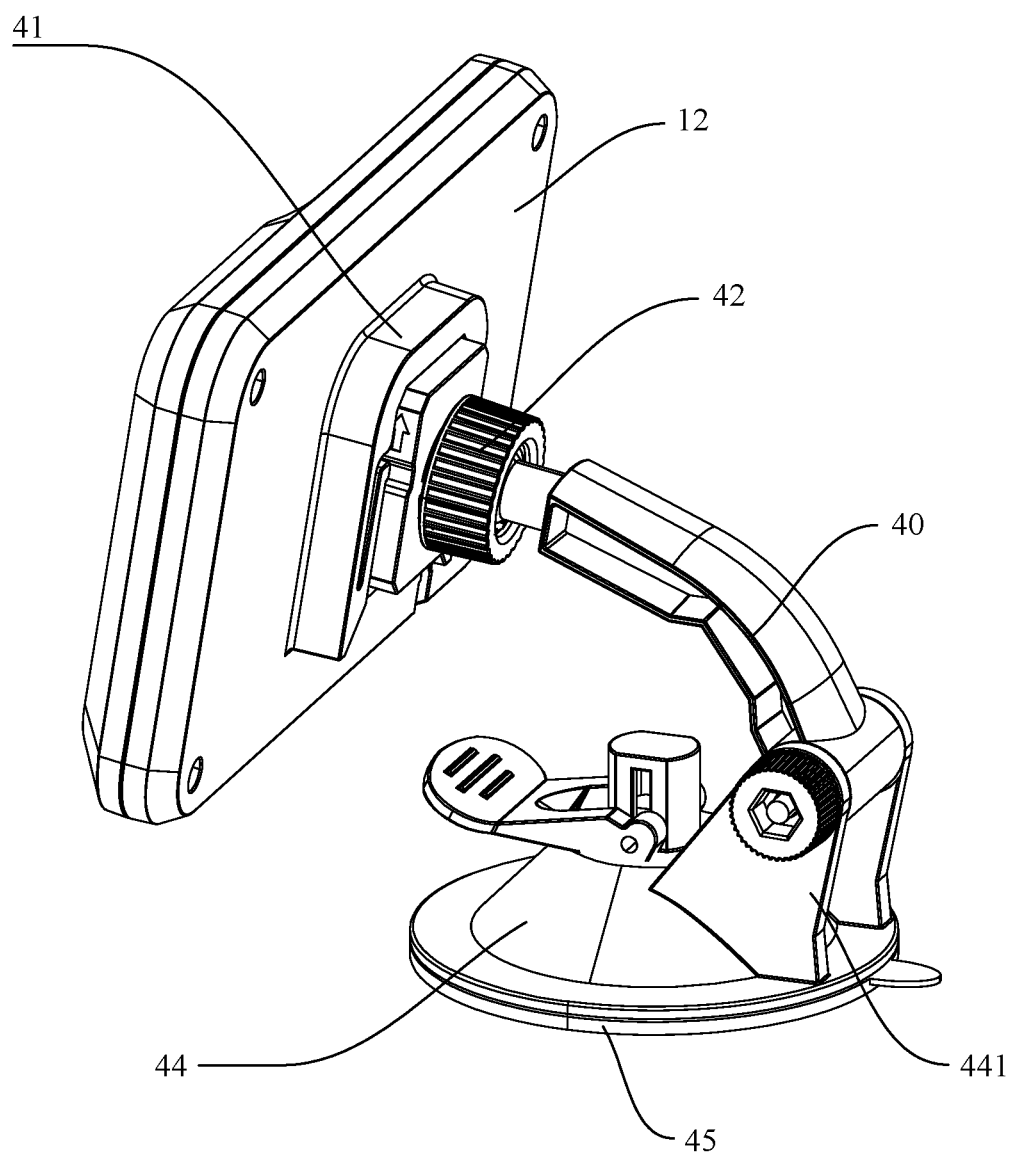
FIG. 3 is a structure diagram of another embodiment of the warning light control device.

In some embodiments, as shown in FIGS. 2 and 3, a bracket 40 assembly is included and a slot 121 is provided on the back housing 12, wherein the bracket 40 assembly includes a snap block 41 that snaps into the slot 121 such that the bracket 40 assembly can be detachably connected to the back housing 12.

In some embodiments, as shown in FIGS. 4 and 5, the bracket 40 assembly comprises a bracket 40 and a locking nut 42, wherein the top of the bracket 40 has a ball head 43, the snap block 41 has a ball head holder 411, the ball head holder 411 has a ball socket that mates with the ball head 43, and the locking nut 42 is mounted on the ball head holder 411. The mating of the ball head 43 and the ball head holder 411 allows the panel to rotate and swing back and forth on a plane, thereby facilitating the user to adjust the angle of the panel for better touch control.

In some embodiments, the bracket 40 assembly comprises a base 44 and a pivot, wherein the bracket 40 is rotatably connected to the base 44 and the lower end of the bracket 40 is provided with a transverse through-hole 442. The base 44 is provided with a connecting portion 441 having open holes aligned with the transverse through-hole 442, allowing the pivot to pass therethrough and pivotally connect the bracket 40 to the base 44, and facilitating height adjustment of the panel.

In addition, the base 44 is provided with a suction cup 45 which facilitates mounting of this control device to a central control panel or a windshield in the vehicle and facilitates removal.

Those skilled in the art will understand that the above preferred embodiments may be freely combined and superimposed without conflict.

The foregoing are only preferred embodiments of the present invention and do not limit the scope of the present invention. All equivalent structural transformations made according to the conception of the present invention and the contents of the present invention specification and drawings, or applied directly or indirectly in other related technical fields, are included in the scope of protection of the present invention.

What is claimed is:

1. A warning light control device comprising:
a housing having a circuit board (20) therein which comprises a main control module (21), a human-machine interaction module (22), and an LED light assembly (23) corresponding to LED chips on the warning light; the housing is provided with a first translucent portion (11) corresponding to the LED light assembly (23), and the main control module (21) is electrically connected to the human-machine interaction module (22) and the LED light assembly (23), respectively, allowing the human-machine interaction module (22) to receive external control signals and transmit the signals to the main control module (21) which controls the LED light assembly (23) and the LED chips on the warning light to flash accordingly.

2. The warning light control device according to claim 1, wherein: the housing comprises an interconnected panel and back housing (12), the circuit board (20) is disposed between the panel and the back housing (12), and the first translucent portion (11) is disposed on the panel.

3. The warning light control device according to claim 2, wherein: the human-machine interaction module (22) is a touch button module, comprising multiple conductive springs (221) and multiple corresponding status indicator lights (222), with the status indicator lights (222) being disposed within the respective conductive springs (221) and both being electrically connected to the main control module (21), respectively; the panel is provided with multiple second translucent portions (13) corresponding to the multiple status indicator lights (222), and the conductive springs (221) transmit the external control signals to the main control module (21) while the status indicator lights (222) indicate the current operating status of the touch button module.

4. The warning light control device according to claim 3, wherein: a light-shield plate (30) is further provided between the panel and the circuit board (20) to prevent light leakage, with the light-shield plate (30) having translucent holes (31) corresponding to the LED light assembly (23) and the status indicator lights (222).

5. The warning light control device according to claim 2, wherein: the circuit board (20) further comprises a display module (24) for displaying a serial number of the current flashing mode of the warning light, the display module (24) is electrically connected to the main control module (21), and the panel is also provided with a display area (14) for observing the display content.

6. The warning light control device according to claim 1, wherein: a bracket (40) assembly is further included and a slot (121) is provided on the back housing (12); wherein the bracket (40) assembly includes a snap block (41) that snap into the slot (121) such that the bracket (40) assembly is detachably connected to the back housing (12).

7. The warning light control device according to claim 6, wherein: the bracket (40) assembly comprises a bracket (40) and a locking nut (42), wherein the top of the bracket (40) has a ball head (43), the snap block (41) has a ball head holder (411), the ball head holder (411) has a ball socket that mates with the ball head (43), and the locking nut (42) is mounted on the ball head holder (411).

8. The warning light control device according to claim 7, wherein: the bracket (40) assembly comprises a base (44), and the bracket (40) is rotatably connected to the base (44).

9. The warning light control device according to claim 8, wherein: a pivot is included; the lower end of the bracket (40) is provided with a transverse through-hole (442), and the base (44) is provided with a connecting portion (441) having open holes aligned with the transverse through-hole (442), allowing the pivot to pass therethrough and pivotally connect the bracket (40) to the base (44).

10. The warning light control device according to claim 8, wherein: the base (44) is provided with a suction cup (45).

* * * * *